United States Patent
Hasegawa

(10) Patent No.: US 8,457,814 B2
(45) Date of Patent: Jun. 4, 2013

(54) RADAR MONITORING DEVICE

(75) Inventor: Koyo Hasegawa, Tokyo (JP)

(73) Assignee: Alpine Electronics, Inc., Tokyo (JP)

( * ) Notice: Subject to any disclaimer, the term of this patent is extended or adjusted under 35 U.S.C. 154(b) by 897 days.

(21) Appl. No.: 12/411,650

(22) Filed: Mar. 26, 2009

(65) Prior Publication Data

US 2009/0299627 A1    Dec. 3, 2009

(30) Foreign Application Priority Data

May 29, 2008 (JP) ................................. 2008-141000

(51) Int. Cl.
*G06F 19/00* (2006.01)
*G06G 7/70* (2006.01)

(52) U.S. Cl.
USPC ............. 701/17; 701/409; 701/446; 701/454; 701/460; 701/514; 342/357.2; 342/357.21; 342/357.22; 342/357.24; 342/357.39

(58) Field of Classification Search
None
See application file for complete search history.

(56) References Cited

U.S. PATENT DOCUMENTS

| | | | | |
|---|---|---|---|---|
| 4,179,693 A | * | 12/1979 | Evans et al. ...................... | 342/64 |
| 4,698,635 A | * | 10/1987 | Hilton et al. .................... | 342/64 |
| 5,933,110 A | * | 8/1999 | Tang et al. ................ | 342/357.37 |
| 6,069,581 A | * | 5/2000 | Bell et al. .......................... | 342/70 |
| 6,232,910 B1 | * | 5/2001 | Bell et al. .......................... | 342/70 |
| 7,119,734 B2 | * | 10/2006 | Nakano et al. ................... | 342/70 |
| 7,167,795 B2 | * | 1/2007 | Hirose et al. ................... | 701/423 |
| 7,598,888 B2 | * | 10/2009 | Matuska et al. ............... | 340/945 |
| 7,602,285 B2 | * | 10/2009 | Sznaider et al. .......... | 340/539.28 |
| 2003/0130767 A1 | * | 7/2003 | Carroll .............................. | 701/3 |
| 2006/0097855 A1 | * | 5/2006 | Turnbull et al. ............ | 340/425.5 |
| 2007/0164896 A1 | | 7/2007 | Suzuki et al. | |
| 2007/0182501 A1 | * | 8/2007 | Saito et al. ...................... | 331/167 |
| 2007/0194978 A1 | * | 8/2007 | Teshirogi et al. ............... | 342/28 |
| 2008/0140267 A1 | * | 6/2008 | Matuska et al. .................... | 701/3 |
| 2008/0177432 A1 | * | 7/2008 | Deker et al. ..................... | 701/17 |
| 2008/0248815 A1 | * | 10/2008 | Busch ......................... | 455/456.5 |

FOREIGN PATENT DOCUMENTS

| | | |
|---|---|---|
| DE | 102004040208 A1 | 2/2006 |
| DE | 102005060131 | * 12/2006 |
| DE | 102005060131 A1 | 6/2007 |
| EP | 2042887 A2 | 4/2009 |
| JP | 09-166452 | 6/1997 |
| JP | 2006-047140 | 2/2006 |

(Continued)

OTHER PUBLICATIONS

European Search Report and Annex for EP09150659, dated Jun. 15, 2010, 2 pgs.

(Continued)

*Primary Examiner* — Fateh Obaid

(74) *Attorney, Agent, or Firm* — Brinks Hofer Gilson & Lione

(57) ABSTRACT

When a vehicle moves into a radar prohibited area preset for the neighborhood of a facility that suffers adverse effects from radar waves, emission of radar waves is stopped, and a voice guidance such as "Radar monitoring is stopped" is sent to a speaker via a voice output unit. Moreover, during a period in which a vehicle is located in a radar prohibited area, an icon that indicates that a radar is being stopped, a mark that indicates an institution for which the radar prohibited area is set, and the scope of the radar prohibited area are displayed on a map image.

13 Claims, 3 Drawing Sheets

FOREIGN PATENT DOCUMENTS

| | | |
|---|---|---|
| JP | 2007-132768 | 5/2007 |
| JP | 2007-271291 | 10/2007 |
| JP | 2008-224355 | 9/2008 |
| JP | 2009-276115 | 11/2009 |

OTHER PUBLICATIONS

Office Action dated Jun. 5, 2012 for Chinese Patent Application No. 200910004572.6, 3 pgs.

Office Action dated Oct. 23, 2012 for Japanese Patent Application No. 2008-141000, 6 pages (including English translation).

Excerpt of Minutes (draft) from Information and Communications Council, Information and Communications Technology sub-Council, UWB Wireless System Committee, UWB Radar Working Group (34rd Session), 13 pages (including English translation of essential part).

* cited by examiner

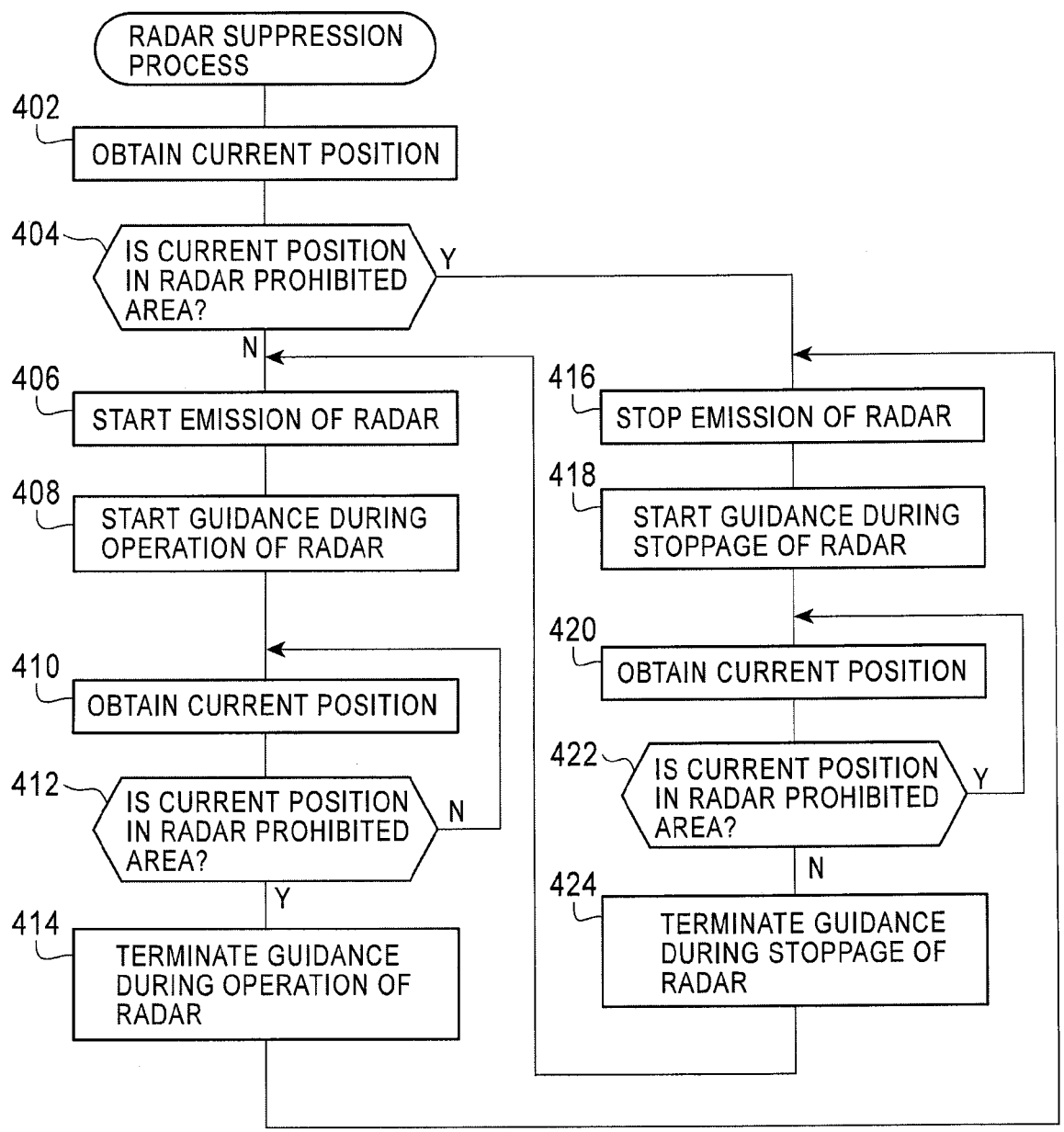

RADAR MONITORING DEVICE

RELATED APPLICATIONS

The present application claims priority to Japanese Patent Application Number 2008-141000, filed May 29, 2008, the entirety of which is hereby incorporated by reference.

BACKGROUND OF THE INVENTION

1. Field of the Invention

The present invention relates to a radar monitoring device that is installed in a vehicle and monitors the neighborhood of the vehicle using a radar unit.

2. Description of the Related Art

A technique for detecting neighboring obstacles using an Ultra WideBand (UWB) radar is known as a radar monitoring device that is installed in a vehicle and monitors the neighborhood of the vehicle using a radar unit (for example, refer to Japanese Unexamined Patent Application Publication No. 2007-132768).

In some cases, for example, normal operations of radio telescopes used in observatories and precision medical equipment used in medical institutions are obstructed by electromagnetic waves radiating in the neighborhood.

On the other hand, radar units installed in vehicles that are mobile units emit electromagnetic waves at unspecified positions in unspecified time periods. Thus, it is feared that adverse effects occur on, for example, such radio telescopes and precision medical equipment. In particular, since UWB radars use a wide frequency band, it is feared to a greater extent that the adverse effects occur.

SUMMARY OF THE INVENTION

Accordingly, it is an object of the present invention to prevent the occurrence of adverse effects on a facility that suffers effects from radar waves, such as a radio telescope or precision medical equipment, caused by a radar unit installed in a vehicle.

To achieve the object, the present embodiments provide a radar monitoring device that monitors the neighborhood and surrounding area of a vehicle using a radar unit. The radar monitoring device may include a storage unit that stores radar prohibited areas that are geographical areas in which emission of a radar wave is prohibited, a current position calculating unit that may calculate a current position, and a radar control unit that may cause the radar unit to stop or halt emission of a radar wave when the current position is located in one of the radar prohibited areas. In particular, the radar control unit may cause the radar unit to stop emission of a radar wave when the current position is moved from outside of a first radar prohibited area of the radar prohibited areas to inside of the first radar prohibited area and may cause the radar unit to start emission of a radar wave when the current position is moved from inside of a second radar prohibited area of the radar prohibited areas to outside of the second radar prohibited area.

As another example, the radar control unit may cause the radar unit to stop emission of a radar wave when the current position is moved from outside of a radar prohibited area, the radar prohibited area being from among a plurality of radar prohibited areas, to inside of the first radar prohibited area. Subsequently, the radar control unit may cause the radar unit to re-start emission of a radar wave when the current position is moved from inside of the radar prohibited area to outside of the radar prohibited area. Therefore, the radar control unit may secure the radar unit when the vehicle crosses into a radar prohibited area, and may enable the radar unit when the vehicle crosses out of a radar prohibited area, or vice versa.

In such a radar monitoring device, since no radar wave is emitted in any preset radar prohibited area, when a radar prohibited area is set in the neighborhood of a facility that suffers effects from radar waves, such as a radio telescope, precision medical equipment, or other radar sensitive equipment, the occurrence of adverse effects on the facility caused by a radar unit installed in a vehicle may be prevented.

The radar monitoring device preferably further may include a radar stoppage notification unit that notifies a user that monitoring of the neighborhood of the vehicle using the radar unit has been stopped when the radar control unit has caused the radar unit to stop emission of a radar wave or a radar stoppage indication unit that indicates to the user that monitoring of the neighborhood of the vehicle using the radar unit is being stopped during stoppage of emission of a radar wave in the radar unit so that, while monitoring of the neighborhood using the radar unit is being stopped, the user may be prevented from erroneously recognizing that monitoring of the neighborhood using the radar unit is being performed.

Moreover, the radar monitoring device may further include a guidance image display unit that displays a guidance image that includes a first map and a current position mark indicating the current position on the first map, and a radar prohibited area display unit that displays the scope of a third radar prohibited area of the radar prohibited areas, the third radar prohibited area may include the current position, on the first map during stoppage of emission of a radar wave in the radar unit. In this case, during the stoppage of emission of a radar wave in the radar unit, when the scope of the first map is included in the third radar prohibited area, the radar prohibited area display unit preferably may display, together with the guidance image, an image that shows, on a second map that may include an entire part of the third radar prohibited area and the current position, the current position and the scope of the third radar prohibited area. Moreover, when each of the radar prohibited areas is set for an institution that includes a facility that suffers an adverse effect from a radar wave in the neighborhood of the institution, a position of the institution is preferably stored in the storage unit for the radar prohibited area, and the radar prohibited area display unit preferably displays a position of an institution for which the third radar prohibited area is set on the first map.

In such an arrangement, the user may readily determine on a map, in relation to the current position, a radar prohibited area, an institution for which the radar prohibited area is set, and the like that currently cause the stoppage of monitoring of the neighborhood using a radar unit.

In the aforementioned radar monitoring device, the radar unit may emit a UWB radar wave.

According to the present invention, the occurrence of adverse effects on a facility that suffers effects from radar waves, such as a radio telescope or precision medical equipment, caused by a radar unit installed in a vehicle may be prevented.

BRIEF DESCRIPTION OF THE DRAWINGS

FIG. 4 is a flowchart showing a radar suppression process according to the exemplary embodiment.

DESCRIPTION OF THE PREFERRED EMBODIMENTS

An exemplary embodiment of the present invention will now be described.

Figure 1A:
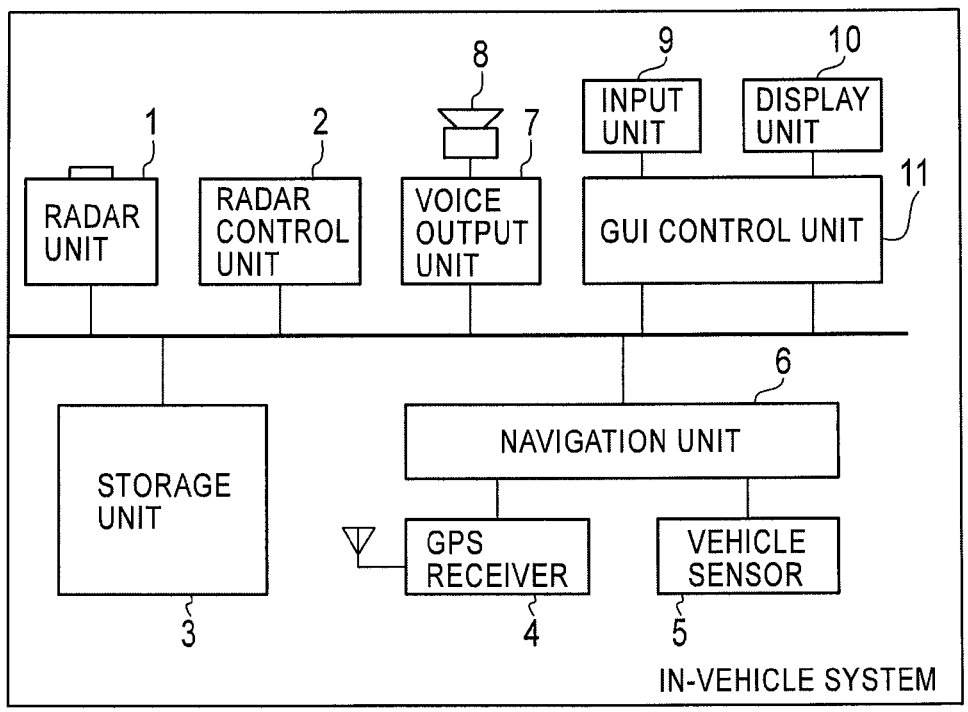
FIG. 1A is a block diagram showing the components of an in-vehicle system according to an exemplary embodiment.

FIG. 1A shows the components of an in-vehicle system according to the exemplary embodiment.

The in-vehicle system may include a radar unit 1, a radar control unit 2, a storage unit 3, a Global Positioning System (GPS) receiver 4, a vehicle sensor 5, a navigation unit 6, a voice output unit 7, a speaker 8, an input unit 9, a display unit 10, and a graphical user interface (GUI) control unit 11 that provides, to users, GUIs in which, for example, the input unit 9 and the display unit 10 are used, as shown in the drawing.

Figure 1B:
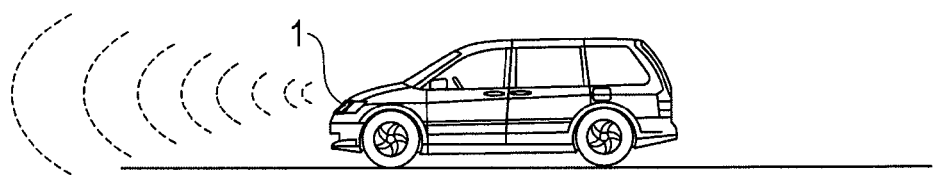
FIG. 1B shows how a radar unit according to the exemplary embodiment may be used.

The radar unit 1 is provided at the front end of a vehicle, as shown in FIG. 1B, and detects the position (distance and direction) of an object in front of the vehicle using a UWB radar or other radar. For example, the radar control unit 2 detects an obstacle in front of the vehicle on the basis of the position of the object detected by the radar unit 1, outputs a notification, a guidance, or the like when an obstacle is detected, and controls the emission of radar waves by the radar unit 1. The radar control unit 2 may be provided in the navigation unit 6 described below.

The vehicle sensor 5 represents a group of sensors that detect various vehicle states, such as an orientation sensor, for example, an angular acceleration sensor or a geomagnetic sensor, and a vehicle speed pulse sensor.

Figure 2:
FIG. 2 shows map data and radar prohibited area information provided in a navigation unit according to the exemplary embodiment.

Map data that expresses maps and radar prohibited area information may be stored in the storage unit 3, as shown in FIG. 2.

In the radar prohibited area information, a prohibited area record set for each radar prohibited area may be registered. A radar prohibited area is an area preset for the neighborhood of an institution equipped with facilities that may suffer adverse effects from radar waves, for example, an observatory equipped with a radio telescope or a medical institution equipped with precision medical equipment, and may be set so that, when a radar is used outside of the area, the electromagnetic waves do not have any effect on the facilities of the institution.

For a prohibited area record set for each radar prohibited area set in this manner, causal institution information that indicates, for example, the institution name, institution type, and position of an institution for which the radar prohibited area may be set, such as an observatory or a medical institution, and prohibited area data that indicates the geographical scope of the radar prohibited area may be registered.

In such an arrangement, the navigation unit 6 may respectively calculate, as the current position and the current traveling direction, the most probable coordinates as the current position and the most probable direction as the current traveling direction by performing, for example, map matching between the current position estimated from the outputs of the vehicle sensor 5, the GPS receiver 4, and the like and a map expressed by a segment of map data read from the storage unit 3.

Moreover, the navigation unit 6 may accept, in response to a request to set a destination from a user, the setting of the destination from the user via the input unit 9 and the GUI control unit 11 and may search for and set a recommended route to the destination.

Figure 3A:
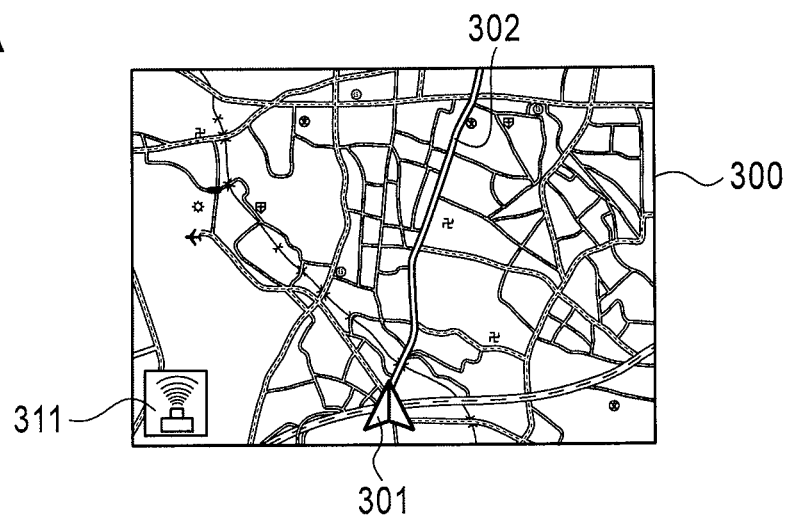
FIGS. 3A, 3B, and 3C show exemplary display screens of the navigation unit according to the exemplary embodiment.

Moreover, the navigation unit 6 may display a map image 300 of the neighborhood of the current position expressed by a segment of map data read from the storage unit 3 on the display screen of the display unit 10 via the GUI control unit 11 on a map scale corresponding to preset user settings, initial settings, and the like so that the calculated current traveling direction is upward, as shown in FIG. 3A. Moreover, at this time, the navigation unit 6 may display a current position mark 301 on a position corresponding to the calculated current position. Moreover, when a recommended route is set, the navigation unit 6 may display, on the map image 300, a recommended route graphic symbol 302 that indicates a part on the side of a destination ahead of the current position on the recommended route. Moreover, when a destination falls within a geographical scope indicated by the map image 300, the navigation unit 6 may display a destination mark that indicates the position of the destination on the map image 300.

A radar suppression process performed by the radar control unit 2 in such an arrangement will next be described.

FIG. 4 shows the steps of the radar suppression process.

In step 402, the navigation unit 6 first obtains the current position calculated in the aforementioned manner, as shown in the drawing. Then, in step 404, it is determined whether the current position is located in any radar prohibited area. In this case, whether the current position is located in any radar prohibited area is determined by determining that, when the current position is located in an area indicated by prohibited area data registered in a prohibited area record in the radar prohibited area information stored in the storage unit 3, the current position is located in a radar prohibited area.

When it is determined that the current position is not located in any radar prohibited area, the process proceeds to step 406. In step 406, the radar control unit 2 causes the radar unit 1 to start the emission of radar waves and the measurement of the position of an object. Then, in step 408, the radar control unit 2 starts guidance during the operation of a radar.

In this case, the guidance during the operation of a radar is performed by, when the guidance is started, reproducing a voice guidance such as "Radar monitoring is started" to the speaker 8 via the voice output unit 7 and displaying an icon 311 that indicates that a radar is in operation on the map image 300 on the display unit 10 via the GUI control unit 11, as shown in FIG. 3A.

Subsequently, the acquisition of the current position in step 410 and the determination of whether the current position is located in any radar prohibited area in step 412 are repeated until the current position is located in a radar prohibited area. When the current position is located in a radar prohibited area, in step 414, the guidance during the operation of a radar is terminated, and then the process proceeds to step 416. In the process of terminating the guidance during the operation of a radar in step 414, the display of the icon 311 is erased.

On the other hand, when it is determined in step 404 that the current position is located in a radar prohibited area, the process proceeds to step 416.

When the process proceeds from step 404 or step 414 to step 416, the radar control unit 2 causes the radar unit 1 to stop the emission of radar waves and the measurement of the position of an object. Then, in step 418, the radar control unit 2 starts guidance during the stoppage of a radar.

Figure 3B:
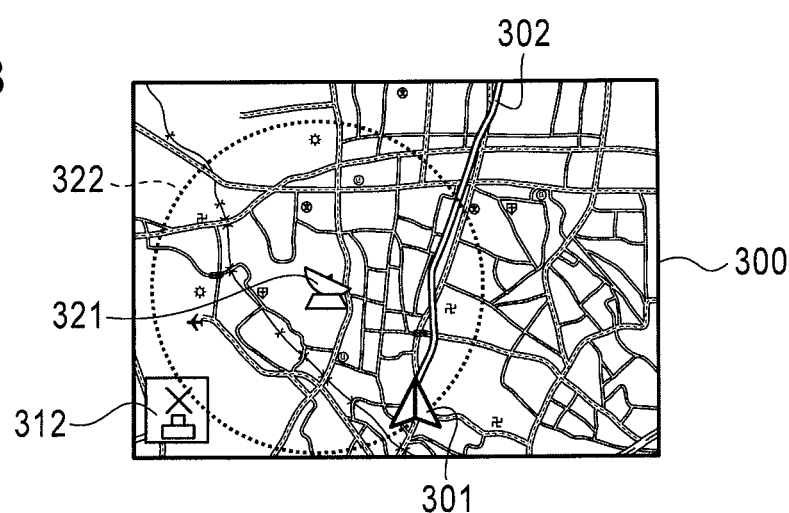
Figure 3C:
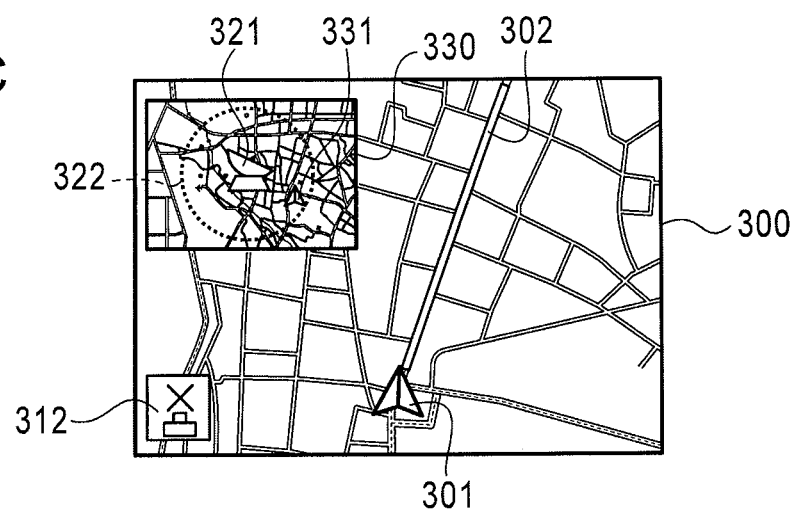

In the guidance during the stoppage of a radar, for example, a voice guidance such as "Since an observatory exists in the neighborhood of the current position, radar monitoring is stopped" may be output to the speaker 8 via the voice output unit 7. An institution name and the like included in a voice guidance are preferably generated after being changed in a manner that depends on causal institution information in the prohibited area record of a prohibited area in which the current position is located. Moreover, concurrently with such voice guidance, an icon 312 that indicates that a radar is being stopped may be displayed, as shown in FIG. 3B. Moreover, in the guidance during the stoppage of emission of a radar or radar waves, a mark 321 that represents an institution type indicated by the causal institution information in the prohibited area record of the radar prohibited area, in which the current position is located, may be displayed on the institution position indicated by the causal institution information on the map image 300. Moreover, in the guidance during the stoppage of emission of a radar or radar waves, a scope 322 of the radar prohibited area indicated by prohibited area data in the prohibited area record of the radar prohibited area, in which the current position is located, may be displayed on the map image 300. In this case, when an entire part or major part of a geographical scope corresponding to the map image 300, which is currently displayed, is covered by the radar prohibited area, the scope of the radar prohibited area cannot be displayed on the map image 300 with good visibility. Thus, the scope of the radar prohibited area may be displayed on the map image 300 in a manner shown in FIG. 3C instead of a manner shown in FIG. 3B.

Specifically, a map 330 of a geographical scope that covers the current position and the entire radar prohibited area may be displayed in a child window on the map image 300 on the basis of the map data, the scale of the map 330 being as large as possible. Then, together with display 331 of the current position, the mark 321 and the scope 322 may be displayed on the map 330.

Subsequently, the acquisition of the current position in step 420 and the determination of whether the current position is located in any radar prohibited area in step 422 may be repeated until the current position is not located in any radar prohibited area. When the current position is not located in any radar prohibited area, in step 424, the guidance during the stoppage of transmission of a radar or radar waves is terminated, and then the process proceeds to step 406. In the process of terminating the guidance during the stoppage or securing of radar in step 424, the display of the icon 312, the display of the mark 321, and the display of the scope 322 may be erased.

The exemplary embodiment has been described.

According to the exemplary embodiment, in this manner, radar waves are not emitted in a radar prohibited area preset for the neighborhood of a facility that suffers effects from radar waves, such as a radio telescope, precision medical equipment, or other radar sensitive equipment. Thus, the occurrence of adverse effects on such a facility caused by the radar unit 1 installed in a vehicle may be prevented.

When the emission of radar waves has been stopped or is being stopped, the condition is shown to a user by, for example, voice and display. Thus, while monitoring of the neighborhood using the radar unit 1 is being stopped, the user can be prevented from erroneously recognizing that monitoring of the neighborhood using the radar unit 1 is being performed.

Moreover, since a radar prohibited area, an institution for which the radar prohibited area is set, and the like may be displayed on a map image, the user may readily determine, in relation to the current position, a radar prohibited area, an institution for which the radar prohibited area is set, and the like that currently cause the stoppage of monitoring of the neighborhood using a radar unit.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A radar monitoring device that monitors a surrounding neighborhood of a vehicle using a radar unit comprising:
a storage unit that stores radar prohibited areas, the radar prohibited areas being geographical areas in which an emission of a radar wave is prohibited;
a current position calculating unit that calculates a current position;
a radar control unit that directs the radar unit to stop emission of a radar wave when the current position is located in one of the radar prohibited areas;
a guidance image display unit that displays a guidance image that includes a first map and a current position mark indicating the current position of the vehicle on the first map; and
a radar prohibited area display unit that displays a geographical scope of a current radar prohibited area of the radar prohibited areas, the current radar prohibited area including the current position, on the first map during the stoppage of emission of a radar wave in the radar unit;
wherein, during stoppage of emission of a radar wave in the radar unit, when an entire or major part of a geographical scope of the first map is included in the geographical scope of the current radar prohibited area, the radar prohibited area display unit displays, together with the guidance image including the first map, an additional image that shows, on a second map having a larger scale that covers an entire part of the geographic scope of the current radar prohibited area, the current position and the geographical scope of the current radar prohibited area.

2. The radar monitoring device according to claim 1, wherein the radar unit emits an Ultra WideBand (UWB) radar wave.

3. The radar monitoring device according to claim 1, wherein the radar control unit directs the radar unit to (1) stop emission of a radar wave when the current position is moved from outside of a first radar prohibited area of the radar prohibited areas to inside of the first radar prohibited area and (2) start emission of a radar wave when the current position is moved from inside of a second radar prohibited area of the radar prohibited areas to outside of the second radar prohibited area.

4. The radar monitoring device according to claim 3, further comprising a radar stoppage notification unit that notifies a user that monitoring of the surrounding neighborhood of the vehicle using the radar unit has been stopped when the radar control unit has directed the radar unit to stop emission of a radar wave.

5. The radar monitoring device according to claim 4, further comprising a radar stoppage indication unit that indicates to the user that monitoring of the surrounding neighborhood of the vehicle using the radar unit is being stopped during stoppage of emission of a radar wave in the radar unit.

6. The radar monitoring device according to claim 3, wherein each of the radar prohibited areas is set for an institution that includes a facility that suffers an adverse effect from a radar wave within a neighborhood of the institution,
   a position of the institution is stored in the storage unit for the radar prohibited area, and
   during stoppage of emission of a radar wave in the radar unit, the radar prohibited area display unit displays a position of an institution for which the current radar prohibited area is set on the first map.

7. The radar monitoring device according to claim 3, further comprising a radar stoppage indication unit that indicates to a user that monitoring of the surrounding neighborhood of the vehicle using the radar unit is stopped during the stoppage of emission of a radar wave in the radar unit.

8. The radar monitoring device according to claim 1, wherein each of the radar prohibited areas is set for an institution that includes a facility that suffers an adverse effect from a radar wave within a neighborhood of the institution,
   a position of the institution is stored in the storage unit for the radar prohibited area, and
   during the stoppage of emission of a radar wave in the radar unit, the radar prohibited area display unit displays a position of an institution for which the current radar prohibited area is set on the first map.

9. A radar unit control method for controlling, in a radar monitoring device that monitors a surrounding neighborhood of a vehicle using a radar unit, operation of the radar unit, the method comprising:
   calculating a current position;
   detecting, on the basis of radar prohibited areas that are geographical areas in which emission of a radar wave is prohibited and are stored in advance in a storage unit, whether the current position is located in one of the radar prohibited areas;
   causing the radar unit to stop emission of a radar wave when the current position is located in one of the radar prohibited areas;
   displaying on a display unit a guidance image that includes a first map and a current position mark indicating the current position of the vehicle on the first map; and
   displaying on the display unit a geographical scope of a current radar prohibited area of the radar prohibited areas, the current radar prohibited area including the current position, on the first map during the stoppage of emission of a radar wave in the radar unit;
   wherein, during stoppage of emission of a radar wave in the radar unit, when an entire or major part of a geographical scope of the first map is included in the geographic scope of the current radar prohibited area, displaying on the display unit, together with the guidance image including the first map, an additional image that shows, on a second map having a larger scale that covers an entire part of the geographical scope of the current radar prohibited area, the current position and the geographical scope of the current radar prohibited area.

10. The radar unit control method according to claim 9, wherein the radar unit is caused to stop emission of a radar wave when the current position is moved from outside of a first radar prohibited area of the radar prohibited areas to inside of the first radar prohibited area, and the radar unit is caused to start emission of a radar wave when the current position is moved from inside of a second radar prohibited area of the radar prohibited areas to outside of the second radar prohibited area.

11. The radar unit control method according to claim 10, further comprising notifying a user that monitoring of the surrounding neighborhood of the vehicle using the radar unit has been stopped when the radar unit has been caused to stop emission of a radar wave.

12. The radar unit control method according to claim 10, further comprising indicating to a user that monitoring of the surrounding neighborhood of the vehicle using the radar unit is being stopped during the stoppage of emission of a radar wave in the radar unit.

13. The radar unit control method according to claim 9, wherein the radar unit is caused to stop emission of a radar wave when the current position is moved from outside of a radar prohibited area to inside of the radar prohibited area, and the radar unit is caused to start emission of a radar wave when the current position is moved from inside of the radar prohibited area to outside of the radar prohibited area.

* * * * *